United States Patent [19]

Widdell

[11] Patent Number: 5,231,800

[45] Date of Patent: Aug. 3, 1993

[54] PLANAR RESURFACING GRINDER MOUNTING AND CONTROL APPARATUS

[76] Inventor: Wayne A. Widdell, 10914 Luscomb Ct., New Port Richey, Fla. 34654

[21] Appl. No.: 762,414

[22] Filed: Sep. 19, 1991

[51] Int. Cl.$^5$ .............................................. B24B 15/00
[52] U.S. Cl. .................................... 51/241 S; 51/126; 51/241 VS; 409/178
[58] Field of Search ................ 51/241 R, 241 S, 245, 51/241 A, 241 XS, 126; 409/178, 179

[56] References Cited

U.S. PATENT DOCUMENTS

| | | | |
|---|---|---|---|
| 1,309,385 | 7/1919 | Yeomans | 409/178 |
| 2,777,263 | 1/1957 | Spence | 409/178 |
| 3,071,902 | 1/1963 | Curfman | 51/241 XS |
| 4,234,275 | 11/1980 | Clement | 51/241 S |
| 4,601,619 | 7/1986 | Stinnett | 409/178 |
| 5,030,046 | 7/1991 | Ricci | 51/241 XS |
| 5,032,051 | 7/1991 | Gilmore | 51/241 S |
| 5,148,633 | 9/1992 | Pigott et al. | 51/241 S |

Primary Examiner—Roscoe V. Parker
Attorney, Agent, or Firm—Charles E. Lykes, Jr.

[57] ABSTRACT

An apparatus to facilitate the maintenance of internal combustion engines, particularly aircraft engines, comprising a mounting apparatus, positioning rod, and pivoting arms from which a grinding, cleaning, or resurfacing tool may be mounted and operated within a single plane of rotation about the positioning rod. In the preferred embodiment of the device the mounting apparatus is made to be mounted upon a variety of common aircraft engines.

10 Claims, 6 Drawing Sheets

PLANAR RESURFACING GRINDER MOUNTING AND CONTROL APPARATUS

BACKGROUND OF THE INVENTION

The invention relates to mechanical tool devices useful in maintaining engines, particularly internal combustion aircraft engines.

Aircraft engine maintenance is particularly critical when compared to the maintenance of most engines when it is considered that aircraft engine failure could easily cost human life while automobile or ground vehicle breakdown normally results in mere, albeit aggravating, inconvenience. Accordingly, aircraft engines undergo more frequent, thorough, and precise maintenance procedures than do most other vehicle or other engines.

Troublesome areas for maintenance concern are the exhaust ports and exhaust manifolds of such engines. In order to ensure efficient and safe evacuation of the exhaust gases from the engine, the surface of the engine block surrounding the exhaust ports must be made planar to within a very small degree of tolerance. This facilitates an airtight fit of the exhaust manifold around the exhaust ports with better and safer evacuation of the exhaust gases.

Formerly, the operation of resurfacing, or grinding, this area of the engine block required removing the particular cylinder or cylinders from the engine assembly. This had to be done in order to permit the careful positioning of a grinding tool in such a manner as to carefully and precisely limit its range of motion within the same plane of the desired surface. Only in this manner could the resurfacing function be satisfactorily performed.

Beginning in 1983, the inventor has designed and developed a tool and mount to more easily accomplish this function. The tool in its early stages comprised a means for fastening a mounting apparatus to the manifold surface of an adjacent exhaust port of a particular aircraft engine. From this mounting apparatus were mounted one or more pivoting arms which permitted free movement of a grinding tool within a precise plane.

Approximately ninety percent of all aircraft using internal combustion engines use one of seven standard engines block sizes. These seven engine block sizes are:
1) the Continental, A and C series engine block;
2) the Continental E series engine block;
3) the Continental IO 360 and TSIO 360 engine block;
4) the Continental O 470, IO 470, TSIO 470, TSIO 520, and IO 520 engine block;
5) the Lycoming parallel valve engine block;
6) the Lycoming angle valve engine block; and
7) the Lycoming upstack engine block. Each of these engines has surfaces upon which such a mounting apparatus could be positioned.

What is not now provided, but would be useful is a single mount facilitating the mounting and using of a planing/resurfacing tool or other type device on a wide variety of aircraft engines, such as the seven listed above. If a tool can be devised to fit each of these engines, than it would be helpful to apply the principles to other engines or combinations of engines. It would also be useful to have such a tool and mount apparatus which mounts to the cylinder head of the same cylinder of the desired exhaust port operation.

SUMMARY OF THE INVENTION

The inventor has developed a tool mount and control apparatus which may be adapted with a universal mount to fit each of the seven standard aircraft engine blocks. Rather than mount to an adjacent exhaust manifold port, the tool mount is adapted to mount to the cylinder head of the exhaust port to be resurfaced after removal of the valve cover. This permits the tool and grinder to be fastened to an engine component which will be absolutely aligned with respect to the concerned surface and may be so mounted after removing only the valve cover and exhaust manifold rather than the cylinder from the engine. Of course, the principles of the invention could be practiced with a mount customized for a single engine or fewer or different engines rather than a universal mount for these particular seven engines.

The apparatus generally comprises a mounting plate, an anchoring member, a positioning rod, and pivoting arms from which a tool may be locked into position and moved freely within a particular and desired plane of motion but not outside of this plane. The mounting plate may be provided with a series of properly dimensioned and positioned holes which permit it to be securely and properly mounted to each of the standard aircraft engine cylinder heads in an orientation so that the positioning rod extends out perpendicularly from the surface of the exhaust port. The mounting plate may also be fastened to the cylinder head through spacers which permit the mounting plate to be spaced from the cylinder head a desired distance.

The anchoring member is fastened to an appropriate spot on the mounting plate and adapted with a channel and locking screw through which the positioning rod can be passed and then locked in the appropriate place. The positioning rod itself is slotted in order to receive the locking screw. From this positioning rod the arm assembly, with holder for a grinding, resurfacing, or cleaning tool, can be pivoted. This arm assembly is adapted to hold two or more arms such that they may pivot about the positioning rod and a point of juncture between themselves, but to keep such motion within a single plane.

The arm assembly may be roughly positioned by sliding it through the anchoring channel and tightening it down with a set screw. Further fine tuning or positioning of the tool may be accomplished by use of the threaded portion of the free end of the positioning rod which, in conjunction with a nut, spacing washer, C-clamp, and spring, hold the pivoting arms in place.

The free end of the outer pivoting arm is adapted with a means of mounting the desired tool. It is primarily envisioned that this would be a grinding or other resurfacing tool, but any kind of tool could be mounted there.

It is, then, an object of the present invention to provide a means of directing a grinding, resurfacing, or cleaning tool through a precisely defined planar range of motion.

It is another object of the present invention to provide such a device which may be mounted upon an engine block or cylinder head of an aircraft engine.

It is another object of the present invention to provide a mounting means for such a device which permits its use without removal of the cylinder from the engine block.

It is another object of the present invention to provide a mounting means for such a device which maybe mounted upon any one of a number of aircraft engines.

Other features and advantages of the present invention will be apparent from the following description in which the preferred embodiments have been set forth in conjunction with the accompanying drawings.

BRIEF DESCRIPTION OF THE DRAWINGS

In describing the preferred embodiments of the invention reference will be made to the series of figures and drawings briefly described below.

DETAILED DESCRIPTION OF THE PREFERRED EMBODIMENT

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

Figure 1:
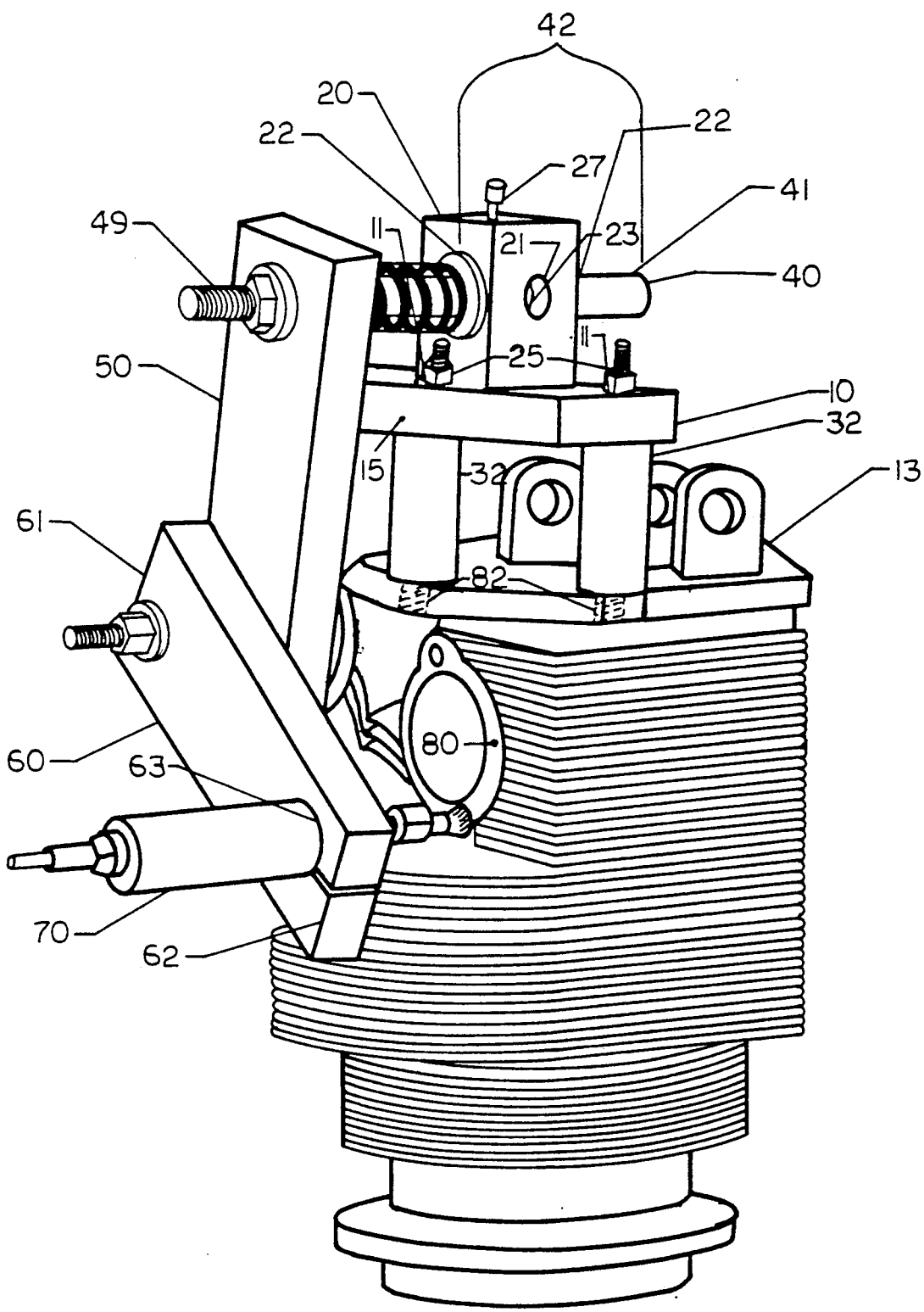
FIG. 1 is a depiction of the entire apparatus as mounted on an engine in which each of the major components may be seen.

Making reference first to FIG. 1, the overall device according to the preferred embodiment will be described. A mounting plate (10) is adapted with a number of elongated slots (11) and precise holes (12) which are positioned to permit the mounting of the plate (10) upon the cylinder head (13) of the engine block (14)) of an aircraft engine from which the valve cover (not depicted) has been removed. After removal of the engine valve cover (not depicted), the mounting plate (10) is secured to the cylinder head (13) of the engine block (generally 14) by turning and tightening one or more fastening bolts (25) into the threaded channels from which the valve cover gasket (not depicted) was removed. Spacers (32) may be used to elevate or otherwise position the mounting plate (10) a proper distance from the cylinder head (13).

Positioned along one elongated side (15) of the mounting plate (10) is an anchoring block (20). The anchoring block (20) is further adapted with one cylindrical channel running along the length of the plate (10) (hereinafter length channel (21)) and another cylindrical channel (22) running along the width of the plate (10) (hereinafter width channel (22)). The two channels (21, 22) intersect in an area (23) at the center of the anchoring block (20). Positioned above the center of the area of intersection (23) of the two channels (21, 22) is a screw channel (26) through which a screw (27) can be turned from the upper surface (28) of the anchoring block to and into the area of intersection (23) of the two channels (21, 22).

It should be pointed out that two cylindrical channels (21, 22) are provided in order to accomodate the use of the present apparatus with a variety of different engines or to possibly accomodate the positioning of the mounting plate (10) on some surface other than the cylinder head (13). As will become apparent later, only one such channel is necessary as the device can only be used to mount one tool to work upon one surface at a time. Such a device would necessarily work with a smaller variety of engines.

Either of the channels (21, 22) are adapted to snugly receive a positioning rod (40). In the embodiment depicted in FIG. 1, the positioning rod (40) is received by the width channel (22) of the anchoring member (20). The positioning rod (40) is adapted with a slot (41) along a portion (42) of its length. The slot (41) is adapted to receive the screw (27) from the anchoring block (20) and hold the positioning rod (40) in place. It should also be pointed out that the portion (42) of the positioning rod adapted to slide through either channel (21 or 22) of the anchoring block (20) need not be cylindrical so long as the configuration of this portion (42) of the rod (40) and the channel (22) match. Whatever relative configuration of these two members (22 and 40) may be used, they should be adapted to permit the positioning rod (40) to snugly slide through the desired channel (21 or 22).

It should also be pointed out that the slot (41) could be replaced by a series of holes (not depicted) along this portion (42) of the postioning rod (40). The locking screw (27) could then be turned down through one of these holes and necessary positioning adjustments to the tool pivot apparatus (as will be depicted and described later, generally (24)) could be made by adjusting such elements of this apparatus as permit final fine-tuning of the apparatus.

From at or near the opposite end (49) of the positioning rod (41) may be pivotally positioned a first, or inner, arm (50). From a point near the opposite end (51) of said first or inner arm (50) may be pivotally fastened a second, or outer, arm (60) near one end (61) of said second arm (60). Near the other end (62) of said second arm (60) is a cavity (63) through or from which a grinding, resurfacing, cleaning tool (70) may be held.

In order to demonstrate how the above-described major components can be assembled and mounted in order to facilitate precise grinding, it is helpful to examine each of the components in greater detail.

Figure 2:
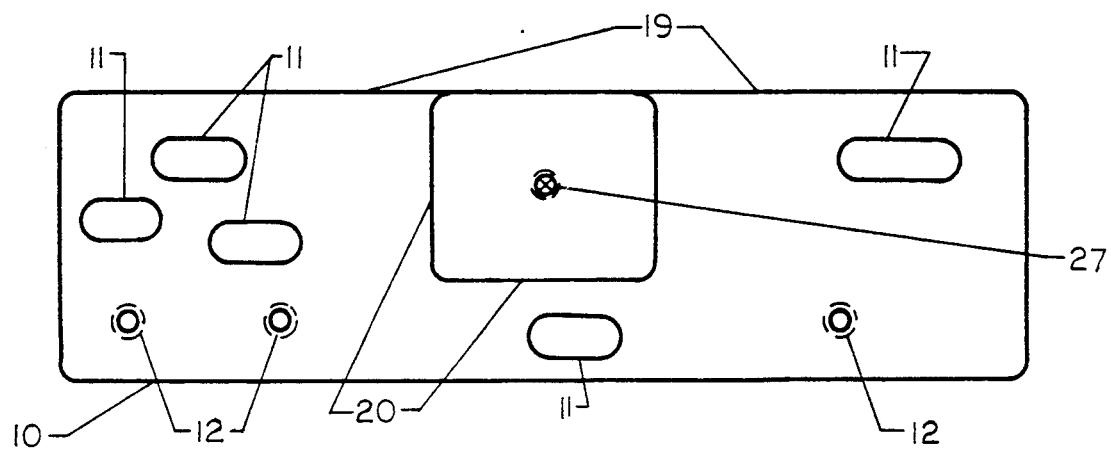
FIG. 2 is a view from above the mounting plate which demonstrates the relative positioning of components attached to the mounting plate as well as the positioning of holes to accept fasteners to engine cylinders.

Making reference first to FIG. 2, it is pointed out that the dimensions of the holes (11) and elongated slots (12) are selected to facilitate the rigid mounting of the mounting plate (10) to the cylinder head (13). It should be noted that normally only two holes would be necessary to mount the plate to a given cylinder head. By providing the series of holes depicted herewith, however, it is possible to manufacture a single mounting plate which will permit the mounting of the device upon any one of the seven common aircraft engines, including those with different relative orientations between cylinder heads and exhaust ports.

Figure 7:
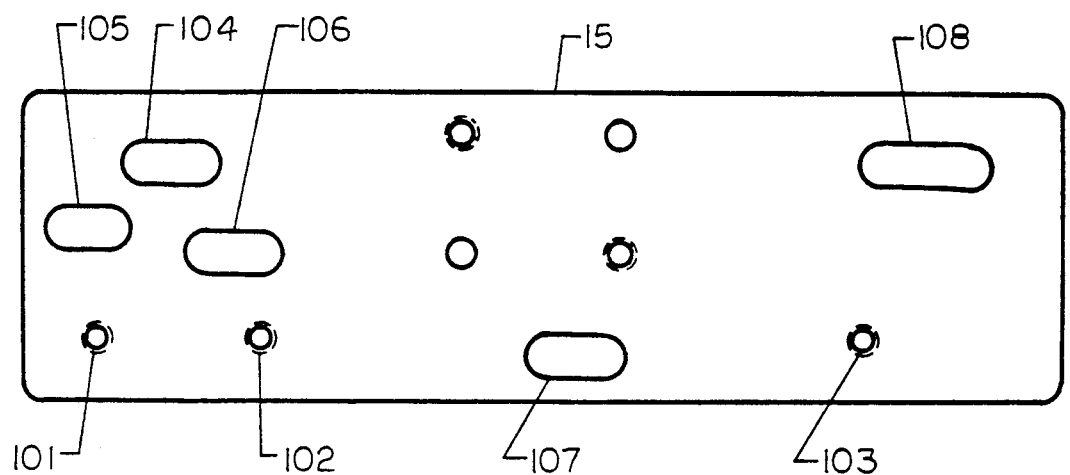
FIG. 7 depicts the pattern of holes in the mounting plate.

Making reference now to FIG. 7, it will be shown how the mounting plate (10) can be adapted to each of the aircraft engines designated in the specifications. It can be seen that the mounting plate (10) is adapted with a pattern of both circular holes (101, 102, 103) and rounded slots (104, 105, 106, 107, 108). Threaded holes (17) have previously been described as the means of securing the anchoring block (20) to the mounting plate (10). The circular holes (101, 102, 103) are also threaded and used for storage of the mounting plate (10). In order to properly position and orient the mounting plate (10) depicted in FIG. 7, the edge (15) along which the anchor member (20) may be positioned is identified and should be considered as the same as in FIG. 1. It should be noted that specific dimensions regarding the sizes of and spaces and distances between the various holes will be discussed. A new numbering pattern for such holes is adapted in order to accurately reflect the fact that FIG. 7 portrays only one of many possibilities of such a pattern and that the specification and claims of the invention ought to be considered only in terms of a variable pattern of round threaded and unthreaded holes and elongated, rounded slots of various sizes in order to accommodate any particular engine or variety of engines.

As depicted on FIG. 7, circular holes (101, 102, and 103) are each ¼ inch in diameter. These circular holes (101, 102, 103) are threaded and primarily used for secure storage of the mounting plate (10). Each of the rounded slots (104, 105, 106, 107, 108) is 9/32 inch wide. The medium rounded slots (104, 106, and 107) each have a middle rectangular opening which is 0.343 inches long and, as described, 9/32 inch wide. At each end of this middle portion, is a semicircular opening such that a round nut of 9/32 inch diameter nut would rest snugly within it. The semicircular ends of short rounded slot (105) and the long rounded slot (108) are the same as for the medium rounded slots (104, 106, 107), but the middle rectangular opening of short slot (105) is only 0.281 inch and of the long rounded slot (108) it is 0.531 inch long.

In defining the spatial relationship between these various holes and slots, the reference point of each of the round holes will be its center from either direction. The reference point for each of the rounded slots will be in one dimension, from a line bisecting its length and, in the other dimension, from the leftmost rectangular portion side in the other direction.

The center lines of rounded slots (104, 108) line up together and the leftmost rectangular side portion of rounded slot (108) is 4.625 inches to the right of the leftmost rectangular side portion of rounded slot (104). The center line of rounded slot (105) is 0.406 inch below the center line of rounded slots (104, 108). The leftmost rectangular side of rounded slot (105) is 0.50 inch to the left of the leftmost rectangular side of rounded slot (104).

The center line of rounded slot (106) is 0.563 inch below the center line of rounded slots (104, 108) and the leftmost rectangular side of rounded slot (106) is 0.375 inch to the right of the leftmost rectangular side of rounded slot (104). The center line of rounded slot (107) is 1.188 inches below the center line of rounded slots (104,108) and the leftmost rectangular side of rounded slot (107) is 2.516 inches to the right of the leftmost rectangular side of rounded slot (104).

The center of round holes (101, 102) is 1.063 inch below the center line of rounded slot (104, 108). The center of round hole (101) is 0.265 inch to the left of the left rectangular side of rounded slot (104). The center of round hole (103) is 1.25 inches below the center line of rounded slots (104, 108) and 4.485 inches to the right of the left rectangular side of the left rectangular side of rounded slot (104).

Any combination of these slots could be used in order to find at least two slots which lined up precisely on valve cover threaded holes (82) within the cylinder head (13) of the engines specified. In most cases, rounded slots (104, 108) would be used, but the other rounded slots (105, 106, 107) may line up appropriately in some cases depending upon the precise valve cover threaded holes (82) (not depicted in FIG. 7) used with each of the engines.

It should again be pointed out that these dimensions have been developed strictly for use with the specified engines. They could be modified further for use with any other engine or combination of engines.

It will normally be necessary to use spacers (32) between the mounting plate (10) and the cylinder head (13) in order to ensure an adequate separation between the positioning rod (40) and the area to be ground (80). Such spacers (32) will be hollowed in order to permit a bolt (25) to be passed from the mounting plate (10) to the cylinder head threaded channels (82). Of course, these spacers (32) may not be necessary in all cases and are not critical to the principles of the invention.

It may be alternatively desirable to have a customized mounting plate (not depicted) which fits upon only one such engine, or made with a pattern of holes (not depicted) to fit any other possible combination of engines. While the preferred embodiment has been described with respect to a pattern of holes to fit the seven most common engines, the device could be made to work with any particular aircraft engine or set of engines. It is also appropriate to note here that the device could also be used with internal combustion engines not associated with aircraft. What is important is to maintain the stability and proper angular relationship between the positioning rod and pivoting arms, as will be more fully described later. Such angular relationships can be created by the use of spacers and orientation of anchoring block and positioning rod channel.

Figure 3:
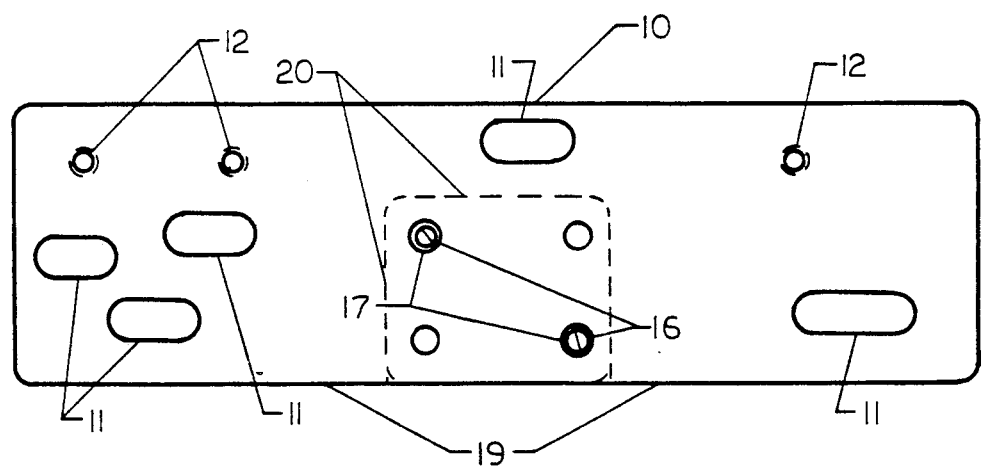
FIG. 3 depicts the bottom of the mounting plate and the positioning of the two screws used to hold the mounting plate and anchoring block together.
Figure 4:
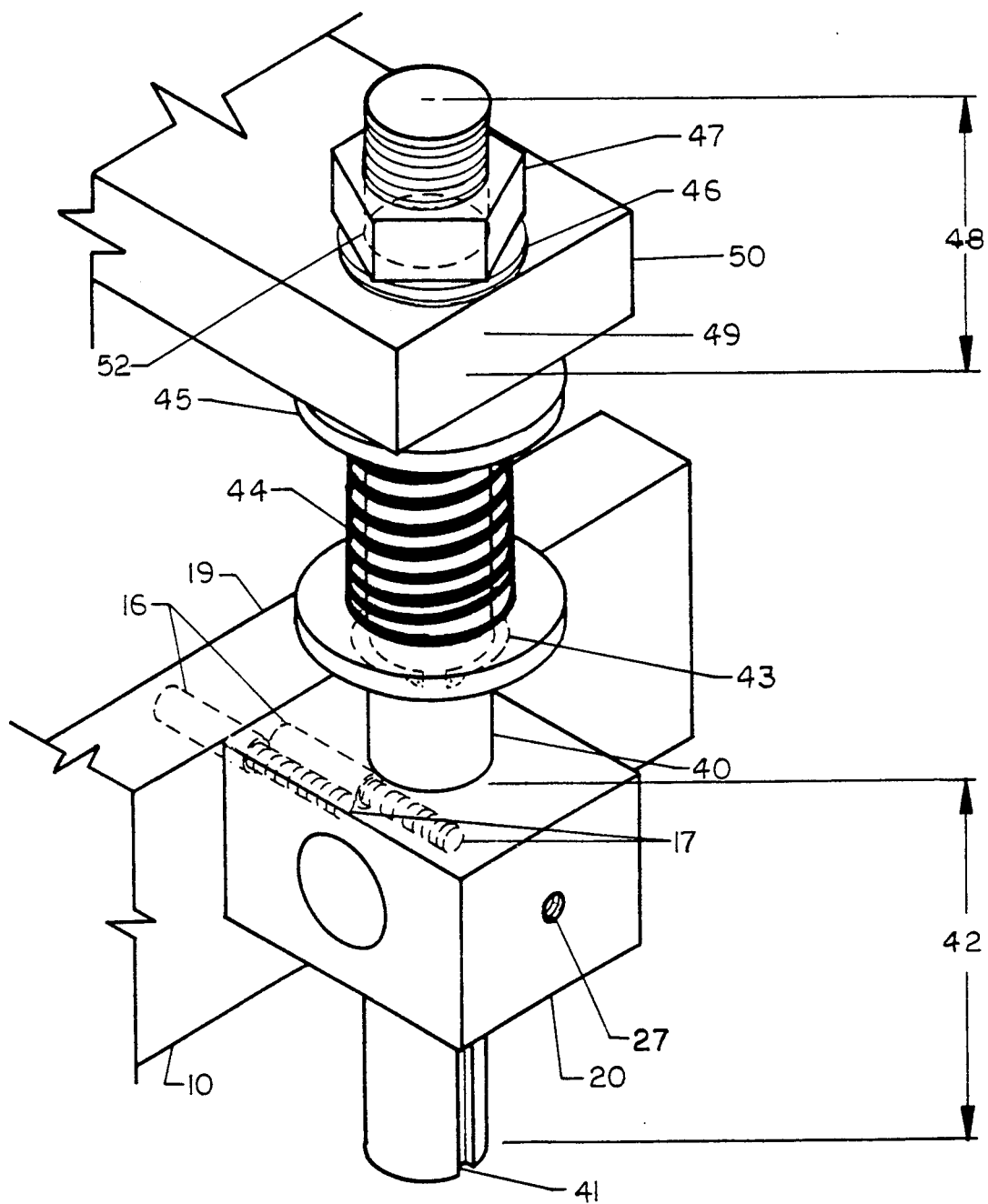
FIG. 4 depicts the positioning rod as used to position the pivot arm assembly.

Making reference to FIG. 3, which depicts the bottom view of the mounting plate (10), it can be seen that two screw channels (16) are provided through which screws (17) may be turned and passed. FIG. 4 depicts that these two screw channels (16) pass through the width of the mounting plate (10) and match up with two identical screw channels (29) through the bottom of the anchoring block (28). The screws (17) may then be turned through each of the channels (16, 29) and firmly fasten the anchoring block (20) to the mounting plate (10).

It should be noted that the device has been shown with two screws (17) to hold the anchoring block (20), but that other means (none of which are figuratively depicted) could be used to fasten the mounting plate (10) and anchoring block (20) together. For instance, three or more screws could be used in the same manner two screws have been described and depicted. Also, only one screw could be used, provided that there were other means (such as positioning pegs or a recessed portion in the mounting plate surface) to hold the anchoring block (20) and mounting plate (10) rigidly and stably together.

In the preferred embodiment of the invention, the anchoring block (20) has been positioned at the center and along one elongated edge (19) of the mounting plate (10). In the case of an apparatus for use with one or more different engines, the anchoring block (20) could be positioned at another area (not depicted) of the mounting plate (10). Also, one or more channels (not depicted) could be made through the anchoring block at different orientations in order to achieve the proper angular relationship between positioning rod (40) and exhaust port surface (80).

Making reference now to FIG. 4 it can be seen that the positioning rod (40) is adapted about its width and along its length with a C clamp (43). This C clamp (43) retains a spring (44) which runs around the positioning rod (40) towards the threaded end of the positioning rod. A first spacing washer (45) can be slid against the spring (44), then the opening (51) of the first arm (50), another spacing washer (46), and then a retaining nut (47) can be turned about a threaded portion (48) from the end of the retaining rod (40). This assembly permits the first arm to be positioned to pivot along a convenient point (49) along the positioning rod (40).

It should be noted that it is necessary to ensure that the opposite sides of the first arm opening (51) and the interior surfaces of the spacing washers (45, 46) are both planar and parallel with each other and that these planes are perpendicular with the length (42) of the positioning rod (40). This ensures that the rotation or pivot of the arm (50) about the positioning rod (40) will be confined to a single plane. While the preferred embodiment of the invention has been described with the use of spacing washers (45, 46), there may be other means of ensuring the desired perpendicular relationship between the arms (50, 60) and positioning rod (40). For instance, the pivoting arm (50) could be made with the hole (90) cut to precisely (or within a very small range of tolerance) the same diameter as that of the positioning rod (40). This would serve to restrict the rotation of the arm (50) about the rod (40) to that of a perpendicular plane and permit the arm (50) to be held in place along the rod (40) by means other than between spacing washers (45, 46). Such means are not depicted, but could include any barrier to sliding movement along the positioning rod (40).

Figure 5:
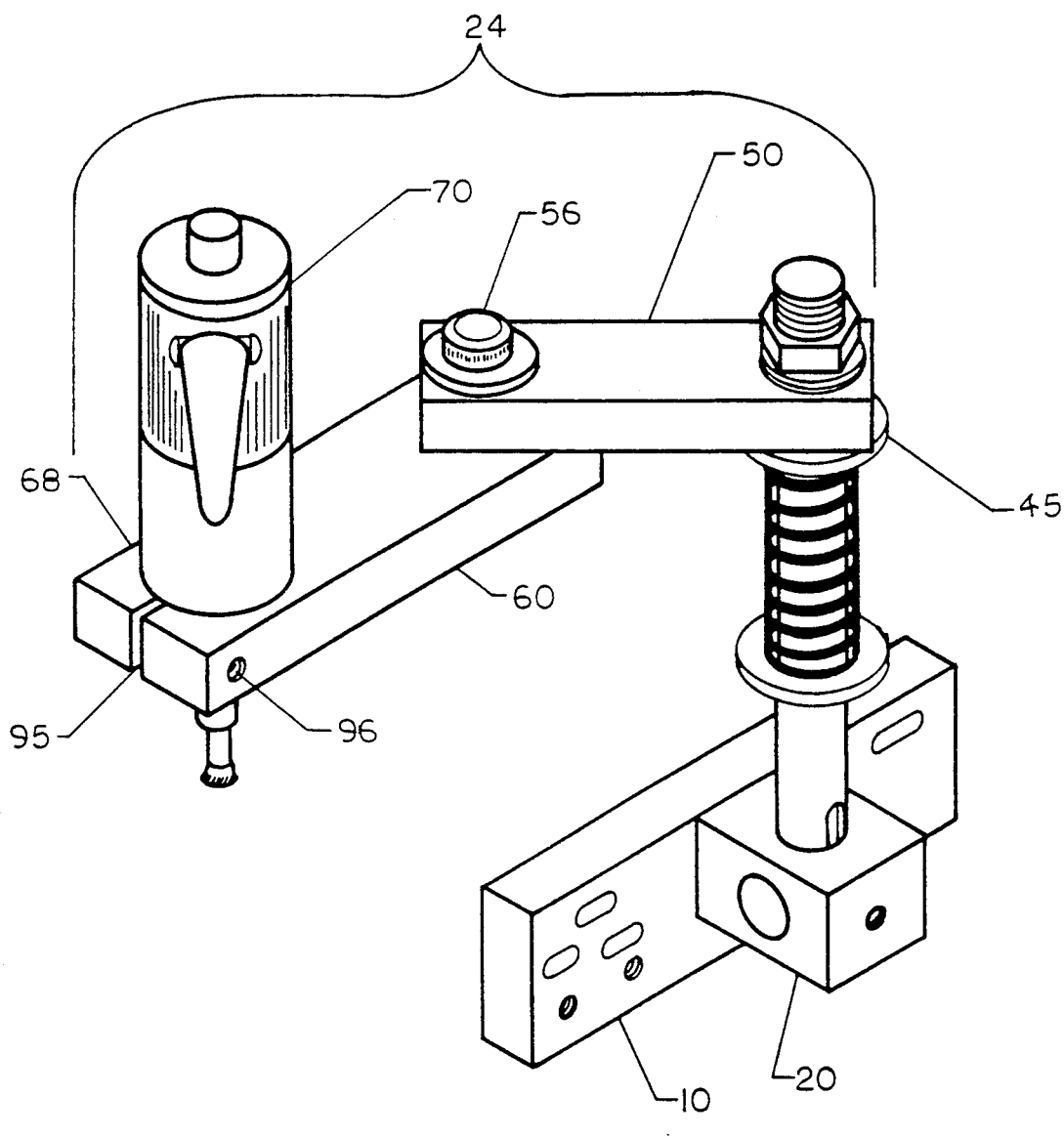
FIG. 5 depicts the pivot arm assembly.

Making reference now to FIG. 5, it can be seen that two pivoting arms (50, 60) are used together in order to achieve a range of planar motion of a mounted tool (70) which extends from a radius (92) very close to the positioning rod (40) to a radius (93) which is very nearly the length of both pivot arms (50, 60) from the positioning rod (40). It should be mentioned here that at least two pivot arms (such as 50, 60) should be used in order to provide for effective coverage of the tool, but that as many more than one arm (not depicted), and of any desired length, may be used in order to optimize coverage of the tool at any desired distance or orientation from the positioning rod (40).

Figure 6:
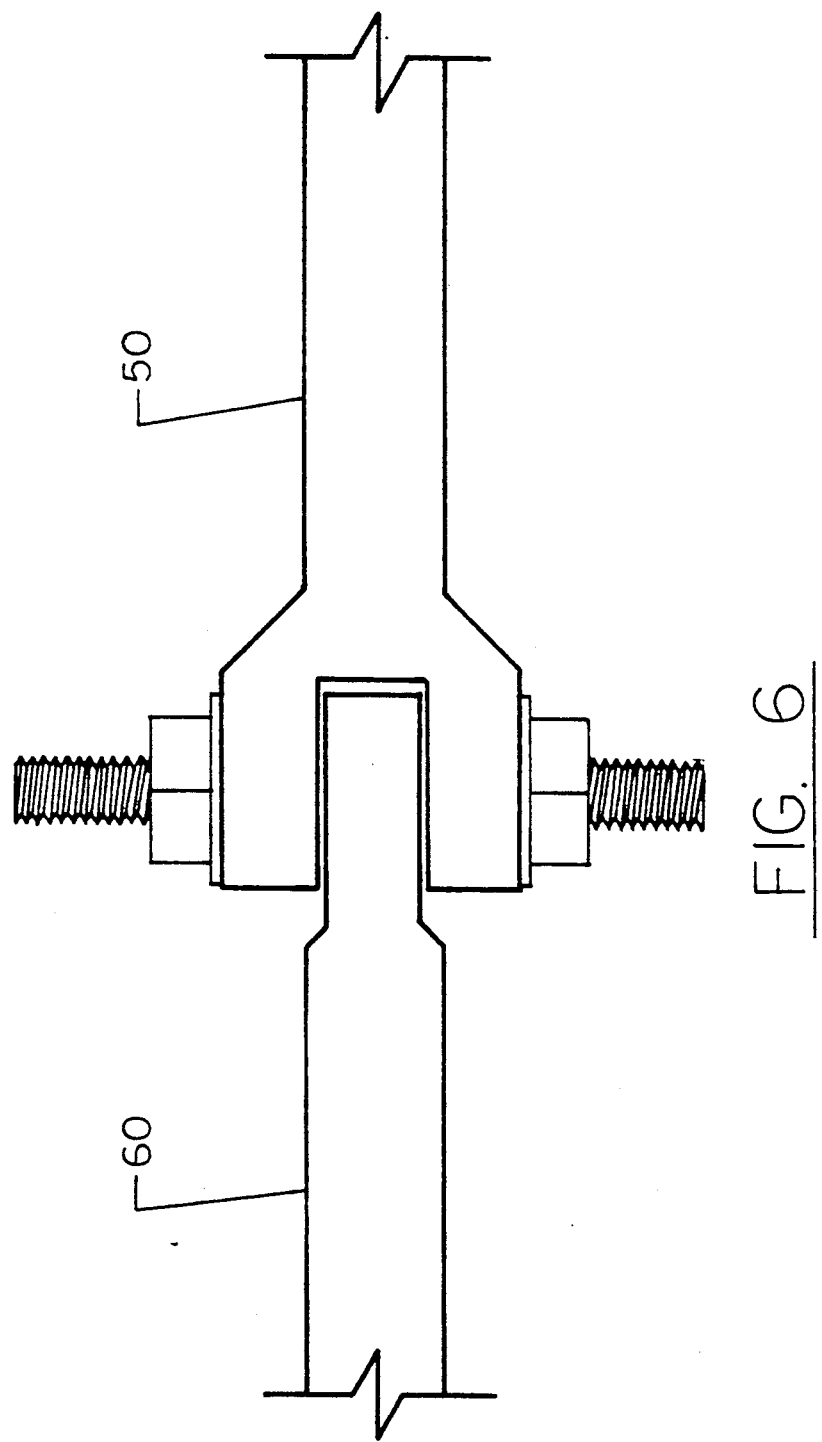
FIG. 6 depicts a planar surface juncture of two pivoting arms.

Spacing washers (53, 54) may also be used to permit the second arm (60) to pivot about a nut (55) and bolt (56) run between holes (57, 63) in the first arm (50) and second arm (60). However, just as with the juncture of the first arm (50) and positioning rod (40), other means could be used to join and stabilize the first and second arms (50 and 60, respectively). What is important is that the first and second arms (50 and 60, respectively) be joined about a common pivot axis (not depicted) so that their planes of pivot or rotation will be either the same or precisely parallel. This could be accomplished with spacing washers as depicted, but could also be accomplished by providing the two arms with smooth, planar surfaces to move against each other or by adapting reach arm with the same sort of precise hole and pivot axle relationship as described for the positioning rod and first arm juncture. FIG. 6 depicts such a juncture.

At the second arm other end (68) apparatus is provided for the secure placement of a tool (93). A hole with slit side (95) and tightening screw (96) is depicted, but any mount may be used. The inventor has used a Dayton Pneumatic grinder, but any kind of resurfacing tool could be used for this purpose. Additionally, tools other than resurfacing tools, such as cleaning, drilling, measuring, or marking could be placed therein.

The angular relationship between the positioning rod (40) and the surface to be cleaned or ground (80) should now be addressed. It can be seen that the pivoting arms (50, 60) are able to rotate about in a plane perpendicular to the positioning rod length (42). The limitation of motion of these arms to such a plane is the key to success of the invention as it was developed in order to facilitate the planing of the exhaust port surfaces. Accordingly, it can be seen that it is critical to fasten and secure the positioning rod (40) in an orientation which is precisely perpendicular to the plane of the surface (80) to be cleaned or ground. As has been previously mentioned, spacers and the orientation of the anchoring block channels could be used to achieve the necessary angular and spatial relationship.

One advantage of designing the mounting plate (10) to work with the seven standard aircraft engines is that each offers cylinder head surfaces which are perpendicular to the planes of their respective exhaust ports. If an engine without this angular relationship was encountered, it would be necessary to adapt an anchoring block (20) which would permit the positioning rod (40) to be extended out along a line perpendicular to that of the objective surface (80).

Further modification and variation can be made to the disclosed embodiments without departing from the subject and spirit of the invention as defined in the following claims. Such modifications and variations, as included within the scope of these claims, are meant to be considered part of the invention as described.

What is claimed is:

1. An apparatus for mounting tools for resurfacing, cleaning, or maintaining internal combustion engine surfaces, particularly of aircraft engines, the apparatus comprising;

a mounting plate, said mounting plate further comprising two or more holes positioned to permit said mounting plate to be securely fastened to the block of an internal combustion engine, and a means for rigidly fastening an anchoring block to said mounting plate;

said anchoring block further comprising at least one cylindrical channel adapted to receive a positioning rod, said anchoring block being further adapted with a set screw which may be turned through a threaded channel from a point upon the exterior of said anchoring block into said cylindrical channel;

said positioning rod being adapted with a slot running along a portion of its length from one end, said slot being adapted to receive an end of said set screw, said positioning rod being further adapted with means for positioning a pivot arm precisely along its length;

a pivot arm assembly, said pivot arm assembly comprising a pivot arm positioned along said positioning rod and one or more additional pivot arms which are adapted to pivot about said positioning rod pivot arm and each other freely through respective planes perpendicular to said positioning rod but not outside said respective planes; and means for placing a tool upon the outer pivot arm of said pivot arms such that the operable portion of said tool may be moved in a plane parallel to the planes of rotation of said pivot arms.

2. The tool mounting and positioning apparatus described in claim 1 in which said positioning rod further comprises a positioning assembly comprising a positioning spring adapted to snugly coil about said positioning rod with one end resting against a blocking member and extending toward a threaded portion on the other end of said positioning, two spacing washers adapted to snugly fit about said positioning rod and a nut adapted to turn about and move along said threaded portion.

3. The tool mounting and positioning apparatus described in claim 2 in which said pivot arm assembly further comprises an inner pivot arm which is adapted to pivot about said positioning rod between said positioning rod spacing washers from at or near an inner pivot arm first end an outer pivot arm which is adapted to pivot from an outer pivot arm first end about a point of junction with said inner pivot arm at or near said inner pivot arm second end and to hold a grinding, cleaning, resurfacing, or other tool at a point at or near its second end such that the functional portion of said tool may be moved freely through a plane perpendicular to said positioning rod but not outside said plane.

4. An apparatus for mounting tools for resurfacing, cleaning, or maintaining internal combustion engine surfaces, particularly of aircraft engines, the apparatus comprising:

a mounting plate, said mounting plate further comprising two or more holes positioned to permit said mounting plate to be securely fastened to the block of an internal combustion engine, and a means for rigidly fastening an anchoring block to said mounting plate;

said anchoring block further comprising at least one cylindrical channel adapted to receive a positioning rod, said anchoring block being further adapted with a set screw which may be turned through a threaded channel from a point upon the exterior of said anchoring block into said cylindrical channel;

said positioning rod being adpated with a slot running along a portion of its length from one end, said slot being adapted to receive an end of said set screw, said positioning rod being further adapted with a blocking member extending radially out from said rod at some point between said slot and the other end of said rod, and a threaded portion at said other end;

a positioning assembly comprising a positioning spring adapted to snugly coil about said positioning rod with one end resting against said blocking member and extending toward said positioning rod threaded end, two spacing washers adapted to snugly fit about said positioning rod and a nut adapted to turn about and move along said threaded portion;

a pivot arm assembly, said pivot arm assembly comprising an inner pivot arm which is adapted to pivot about said positioning rod between said positioning rod spacing washers from at or near an inner pivot arm first end and an outer pivot arm which is adapted to pivot from an outer pivot arm first end about a point of junction with said inner pivot arm at or near said inner pivot arm second end and to hold a grinding, cleaning, resurfacing, or other tool at a point at or near its second end such that the functional portion of said tool may be moved freely through a plane perpendicular to said positioning rod but not outside said plane.

5. An apparatus for mounting tools for resurfacing, cleaning, or maintaining internal combustion engine surfaces, particularly of aircraft engines, the apparatus comprising;

a mounting plate, said mounting plate further comprising two or more holes positioned to permit said mounting plate to be securely fastened to the block of an internal combustion engine, and a means for rigidly fastening an anchoring block to said mounting plate;

said anchoring block further comprising at least one cylindrical channel adapted to receive a positioning rod, said anchoring block being further adapted with a set screw which may be turned through a threaded channel from a point upon the exterior of said anchoring block into said cylindrical channel;

said positioning rod being adapted with a slot running along a portion of its length from one end, said slot being adapted to receive an end of said set screw, said positioning rod being further adapted with a blocking member extending radially out from said rod at some point between said slot and the other end of said rod, and a threaded portion at said other end;

a positioning assembly comprising a positioning spring adapted to snugly coil about said positioning rod with one end resting against said blocking member and extending toward said positioning rod threaded end, two spacing washers adapted to snugly fit about said positioning rod and a nut adapted to turn about and move along said threaded portion;

a pivot arm assembly, said pivot arm assembly comprising an inner pivot arm which is adapted to pivot about said positioning rod between said positioning rod spacing washers from at or near an inner pivot arm first end, one or more intermediate pivoting arms, each of which is adapted to pivot about a point of juncture between each successive arm in a chain of pivoting arms in planes either congruent or precisely parallel with each other plane of rotation, and a tool-mounting pivot arm which is adapted to pivot from a point near the outer end of said outer successive intermediate arm, said tool-mounting pivot arm being further adapted to hold a grinding, cleaning, resurfacing, or other tool at a point at or near its second end such that the functional portion of said tool may be moved freely through a plane perpendicular to said positioning rod but not outside said plane.

6. The tool-mounting apparatus described in claim 1 in which hollowed spacing members are used between said cylinder head and said mounting plate in order to permit said mounting plate to be rigidly bolted at a desired distance from said cylinder head.

7. The tool-mounting apparatus described in claim 2 in which hollowed spacing members are used between said cylinder head and said mounting plate in order to permit said mounting plate to be rigidly bolted at a desired distance from said cylinder head.

8. The tool-mounting apparatus described in claim 3 in which hollowed spacing members are used between said cylinder head and said mounting plate in order to permit said mounting plate to be rigidly bolted at a desired distance from said cylinder head.

9. The tool-mounting apparatus described in claim 4 in which hollowed spacing members are used between said cylinder head and said mounting plate in order to permit said mounting plate to be rigidly bolted at a desired distance from said cylinder head.

10. The tool-mounting apparatus described in claim 5 in which hollowed spacing members are used between said cylinder head and said mounting plate in order to permit said mounting plate to be rigidly bolted at a desired distance from said cylinder head.

* * * * *